United States Patent
Sugiura et al.

(10) Patent No.: US 10,914,840 B2
(45) Date of Patent: Feb. 9, 2021

(54) SELF POSITION ESTIMATION APPARATUS

(71) Applicant: KABUSHIKI KAISHA TOSHIBA, Tokyo (JP)

(72) Inventors: Takayuki Sugiura, Kanagawa (JP); Tomoki Watanabe, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/554,669

(22) Filed: Aug. 29, 2019

(65) Prior Publication Data

US 2020/0292704 A1 Sep. 17, 2020

(30) Foreign Application Priority Data

Mar. 15, 2019 (JP) .................. 2019-048720

(51) Int. Cl.
*G01S 17/46* (2006.01)
*G01S 7/48* (2006.01)
*G01S 17/89* (2020.01)

(52) U.S. Cl.
CPC ............ *G01S 17/46* (2013.01); *G01S 7/4808* (2013.01); *G01S 17/89* (2013.01)

(58) Field of Classification Search
None
See application file for complete search history.

(56) References Cited

U.S. PATENT DOCUMENTS 10,422,656 B2 * 9/2019 Wakayanagi ........ G01C 21/367

FOREIGN PATENT DOCUMENTS

JP 2018116014 A 7/2018

OTHER PUBLICATIONS

Skog et al. (In-car Positioning and Navigation Technologies—A Survey, IEEE Transaction of Intelligent Transportation Systems, vol. 10. No. 1, 2009, p. 4-21). (Year: 2009).*

* cited by examiner

*Primary Examiner* — Roy Y Yi
(74) *Attorney, Agent, or Firm* — Holtz, Holtz & Volek PC

(57) ABSTRACT

A self position estimation apparatus according to an embodiment includes an acquisition unit configured to acquire map data, and a calculation unit configured to calculate a correspondence weight between observation data on a region around the moving object and the map data, based on a variation amount of depth in a predetermined direction.

18 Claims, 12 Drawing Sheets

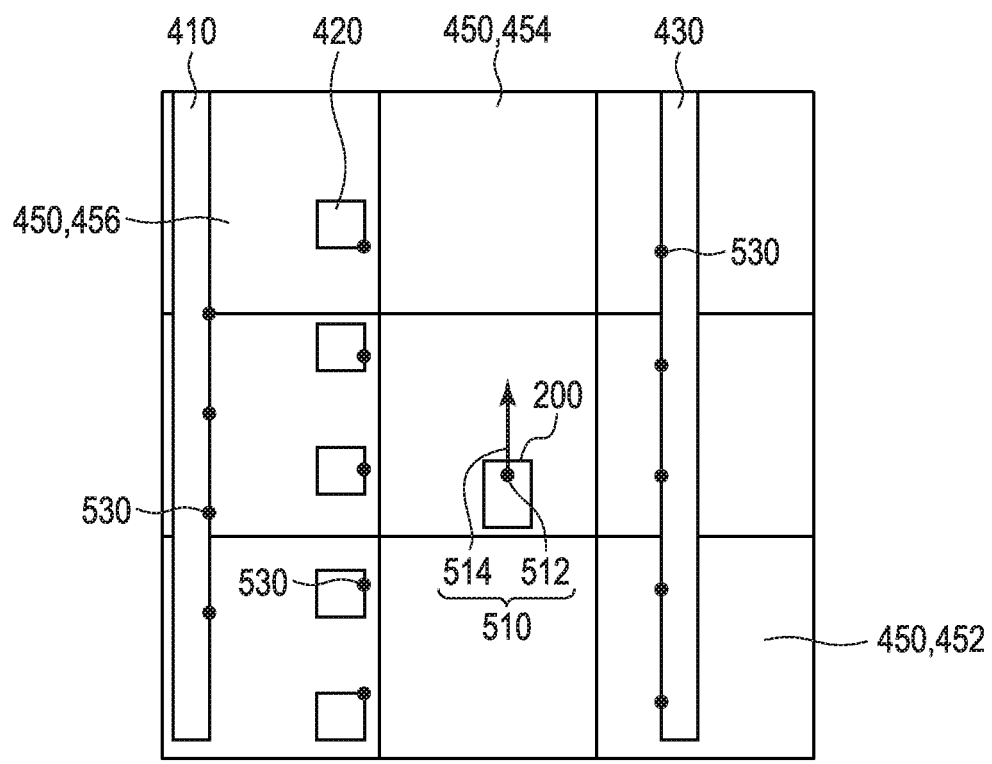
F I G. 13
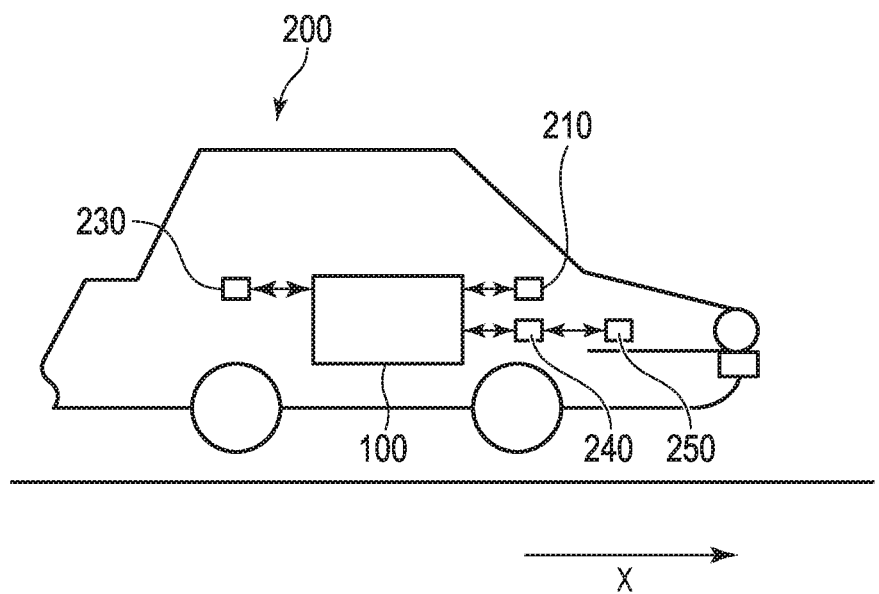
F I G. 14

US 10,914,840 B2

SELF POSITION ESTIMATION APPARATUS

CROSS-REFERENCE TO RELATED APPLICATIONS

This application is based upon and claims the benefit of priority from Japanese Patent Application No. 2019-048720, filed Mar. 15, 2019; the entire contents of which are incorporated herein by reference.

FIELD

Embodiments relate to a self position estimation apparatus configured to estimate the self position of a moving object in a map.

BACKGROUND

The self position of a moving object in a map is estimated in automatic driving and driver assistance, and highly accurate determination using information linked to the map and high accuracy of the motion estimation of the moving object are expected. The estimation of the self position of the moving object is performed by associating observation data acquired by a sensor mounted on the moving object with map data.

BRIEF DESCRIPTION OF THE DRAWINGS

FIG. 13 is a diagram showing the self position of the moving object in the map after the alignment shown in FIG. 12 is performed.

FIG. 14 is a diagram showing an example of the structure of the moving object.

DETAILED DESCRIPTION

A self position estimation apparatus according to an embodiment includes an acquisition unit configured to acquire map data, and a calculation unit configured to calculate a correspondence weight between observation data on a region around the moving object and the map data, based on a variation amount of depth in a predetermined direction.

First Embodiment

[Configuration of Self Position Estimation Apparatus 100]

Figure 1:
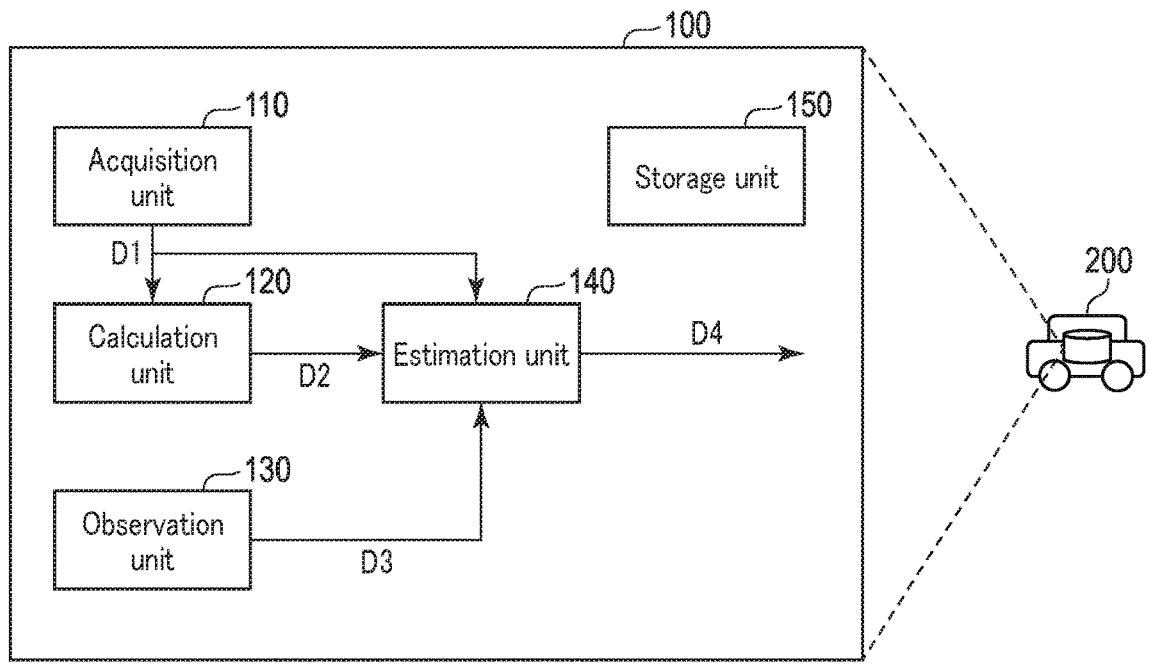
FIG. 1 is a diagram showing the configuration of a self position estimation apparatus according to the first embodiment.

FIG. 1 is a diagram showing a configuration of the self position estimation apparatus according to the first embodiment. The self position estimation apparatus 100 is mounted on a moving object 200. The moving object 200 is, for example, a vehicle (a motorcycle, a four-wheeled vehicle, or a bicycle), a cart, or a robot. The vehicle is, for example, a vehicle that travels based on the driving operation by a person or a vehicle that can travel automatically without the driving operation by a person. The vehicle that can travel automatically is, for example, an automatic driving vehicle. A description will be given of the case where the moving object 200 is an automatic driving vehicle.

The self position estimation apparatus 100 includes an acquisition unit 110, a calculation unit 120, an observation unit 130, an estimation unit 140, and a storage unit 150. The acquisition unit 110, calculation unit 120, estimation unit 140, and storage unit 150 are constituted by, for example, a dedicated or general-purpose computer. The functions of the acquisition unit 110, calculation unit 120, and estimation unit 140 are implemented, for example, by causing a hardware processor, such as a CPU, to execute a program stored in the storage unit 150.

The acquisition unit 110 is configured to acquire map data. Also, the acquisition unit 110 is configured to output the acquired map data D1 to the calculation unit 120 and the estimation unit 140.

The observation unit 130 is configured to observe the environment around the moving object 200 and acquire observation data D3. Also, the observation unit 130 is configured to output the acquired observation data D3 to the estimation unit 140.

The observation unit 130 includes, for example, a distance sensor. The distance sensor is, for example, a LIDAR sensor. The LIDAR sensor is configured to scan in the scanning direction while emitting a laser beam, receive the laser beam reflected by an object, and calculate a distance to the object in the radiation direction, based on the radiation direction of the received laser beam and the elapsed time from the emission of the laser beam to the reception of the laser beam.

The calculation unit 120 is configured to calculate, from the map data D1 input from the acquisition unit 110, a correspondence weight between the map data D1 and the observation data D3 that is used for estimating the position of the moving object 200 in the map. To be more specific, the calculation unit 120 is configured to calculate the correspondence weight based on the variation amount of depth in a predetermined direction on the map. The depth is intended to refer to a distance from a virtual observation position to an object, e.g., an obstacle, in the map data D1. The obstacle is an object with which the collision of the moving object 200 should be avoided. Also, the calculation unit 120 is configured to output information on the calculated correspondence weight, i.e., weight data D2, to the estimation unit 140.

The estimation unit 140 is configured to associate the map data D1 input from the acquisition unit 110 with the observation data D3 input from the observation unit 130, based on the correspondence weight data D2 input from the calculation unit 120, and to estimate the self position of the moving object 200 in the map. The self position of the moving object 200 includes the coordinates of the position of the moving object 200 in the map and the direction of movement of the moving object 200. Also, the estimation unit 140 is configured to output information on the estimated self position of the moving object 200, i.e., self position data D4. The self position data D4 includes map data D1 and data on the self position of the moving object 200 associated with the map data D1.

The storage unit 150 is configured to store various data. The storage unit 150 is configured to store, for example, any one or all of the map data D1, the weight data D2, the observation data D3, and the self position data D4. The storage unit 150 may be, for example, a RAM, a semiconductor memory device such as a flash memory, a hard disk, an optical disk, or the like.

[Summary of Operation of Self Position Estimation Apparatus 100]

Figure 2:
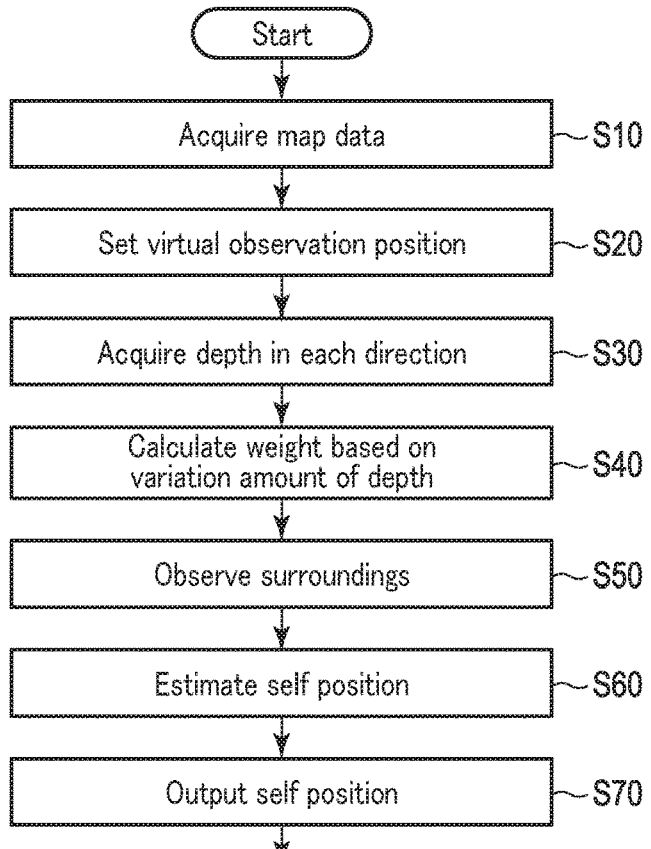
FIG. 2 is a flowchart showing the operation of the self position estimation apparatus according to the first embodiment.

FIG. 2 is a flowchart showing the operation of the self position estimation apparatus 100 according to the first embodiment. The operation of the self position estimation apparatus 100 will be briefly described below.

First, in step S10, the acquisition unit 110 acquires map data D1 on the region around the moving object 200.

Next, in step S20, the calculation unit 120 sets a virtual observation position in the map based on the input map data D1.

Further, in step S30, the calculation unit 120 scans observation vectors in a predetermined direction and acquires a depth in each of the directions of the observation vectors. The observation vectors are vectors starting from the virtual observation position. The acquisition of the depth is performed by calculating the distances from the virtual observation position to objects, e.g., obstacles, located on the observation vectors.

In step S40, the calculation unit 120 calculates the correspondence weight between the map data D1 and the observation data D3 for each of the areas in the map, based on the variation amount of depth in a predetermined direction.

In step S50, the observation unit 130 observes the environment around the moving object 200 and acquires observation data D3.

Next, in step S60, the estimation unit 140 estimates the self position of the moving object 200 in the map, using the map data D1, the weight data D2, and the observation data D3. To be more specific, based on the correspondence weight data D2 of each of the areas in the map and in accordance with the degree of coincidence between the map data D1 and the observation data D3 of each of the areas, an object based on the map data D1 and an object based on the observation data D3 are aligned with each other in order to estimate the self position of the moving object 200 in the map.

Finally, in step S70, the estimation unit 140 outputs information on the self position of the moving object 200 in the map.

[Problem in Estimation of Self Position of Moving Object 200]

Prior to a detailed description of the operation of the self position estimation apparatus 100, a problem in the estimation of the self position of the moving object 200 will be described.

In the estimation of the self position of the moving object 200, it is preferable that objects existing around the moving object 200 hardly change in their observation points (for example, positions as viewed in the horizontal direction) even when the self position of the moving object changes slightly. Examples of such objects are objects having planes substantially perpendicular to the ground, such as a fence or a wall of a building. On the other hand, around the moving object 200, there may be objects whose observation points change greatly when the self position of the moving object 200 moves slightly. Examples of such objects are plants, such as a shrubbery or a hedge, and banks sloping to the ground. Observation data on such objects may not be suitably associated with map data when the self position of the moving object 200 is estimated.

Figure 3A:
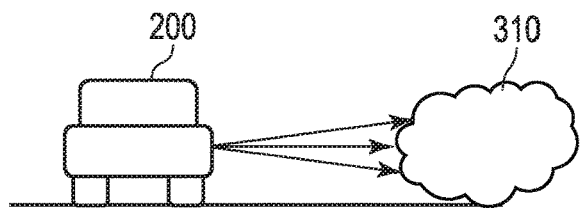
FIG. 3A is a diagram schematically showing an observation example in which a plant is a target and shows how observation is performed based on light reflected on the near side of the plant.
Figure 3B:
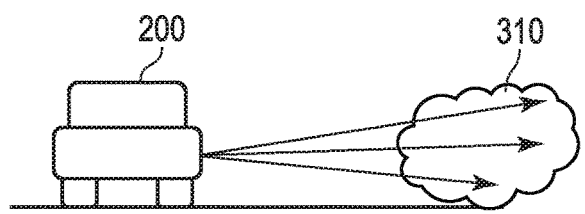
FIG. 3B is a diagram schematically showing an observation example in which a plant is a target and shows how observation is performed based on light reflected on the rear side of the plant.

FIGS. 3A and 3B schematically show observation examples in which plant 310 such as a shrubbery or a hedge is a target. Where the target is the plant 310, there is a gap between the branches and leaves, so that different depths are observed depending on the observation directions. FIG. 3A shows a state where observation is performed based on the light reflected on the near side of the plant 310. FIG. 3B shows a state where observation is performed based on the light reflected on the rear side of the plant 310. Thus, the depth observed with respect to the plant 310 varies from the near side to the rear side of the plant 310, depending on the observation directions. For this reason, the self position of the moving object 200 obtained by associating the observation data of the plant 310 with the map data is low in accuracy.

Figure 4A:
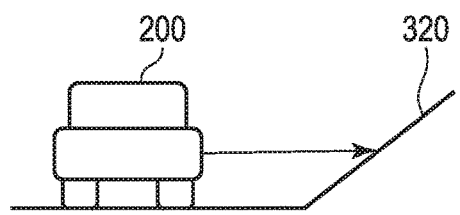
FIG. 4A is a diagram schematically showing an observation example in which a bank inclined with respect to a horizontal plane is a target, and shows a state in which a moving object is observed in a horizontal state.
Figure 4B:
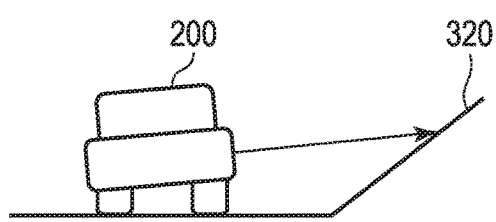
FIG. 4B is a diagram schematically showing an observation example in which a bank inclined with respect to a horizontal plane is a target, and shows a state in which a moving object is observed in an inclined state.
Figure 4C:
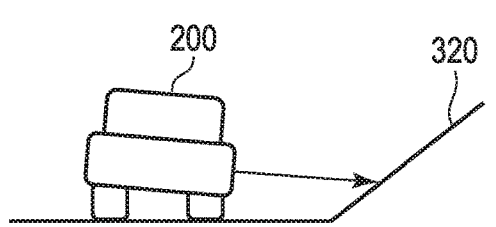
FIG. 4C is a diagram schematically showing an observation example in which a bank inclined with respect to a horizontal plane is a target, and shows a state in which a moving object is inclined to the opposite side to that shown in FIG. 4B.

FIGS. 4A to 4C schematically show an observation example in which a bank 320 that is inclined with respect a horizontal plane is a target and a distance sensor for observing the horizontal plane is used. Even where observation is performed from the same point, the angle of the observation plane changes due to a posture change of the moving object 200, for example, due to a change of the rolling angle, so that the height of the observation position of the bank 320 changes and the observed depth varies. For example, as compared with the depth observed in the state where the moving object 200 is horizontal as shown in FIG. 4A, the depth observed in the state where the moving object 200 is inclined as shown in FIG. 4B is long, and conversely the depth observed in the state where the moving object 200 is inclined as shown in FIG. 4C is short. Thus, the depth observed with respect to the bank 320 varies in accordance with, for example, a change in the rolling angle of the moving object 200. For this reason, the self position of the moving object 200 obtained by associating the observation data of the bank 320 with the map data is low in accuracy.

[Details of Operation of Self Position Estimation Apparatus 100]

Figure 5:
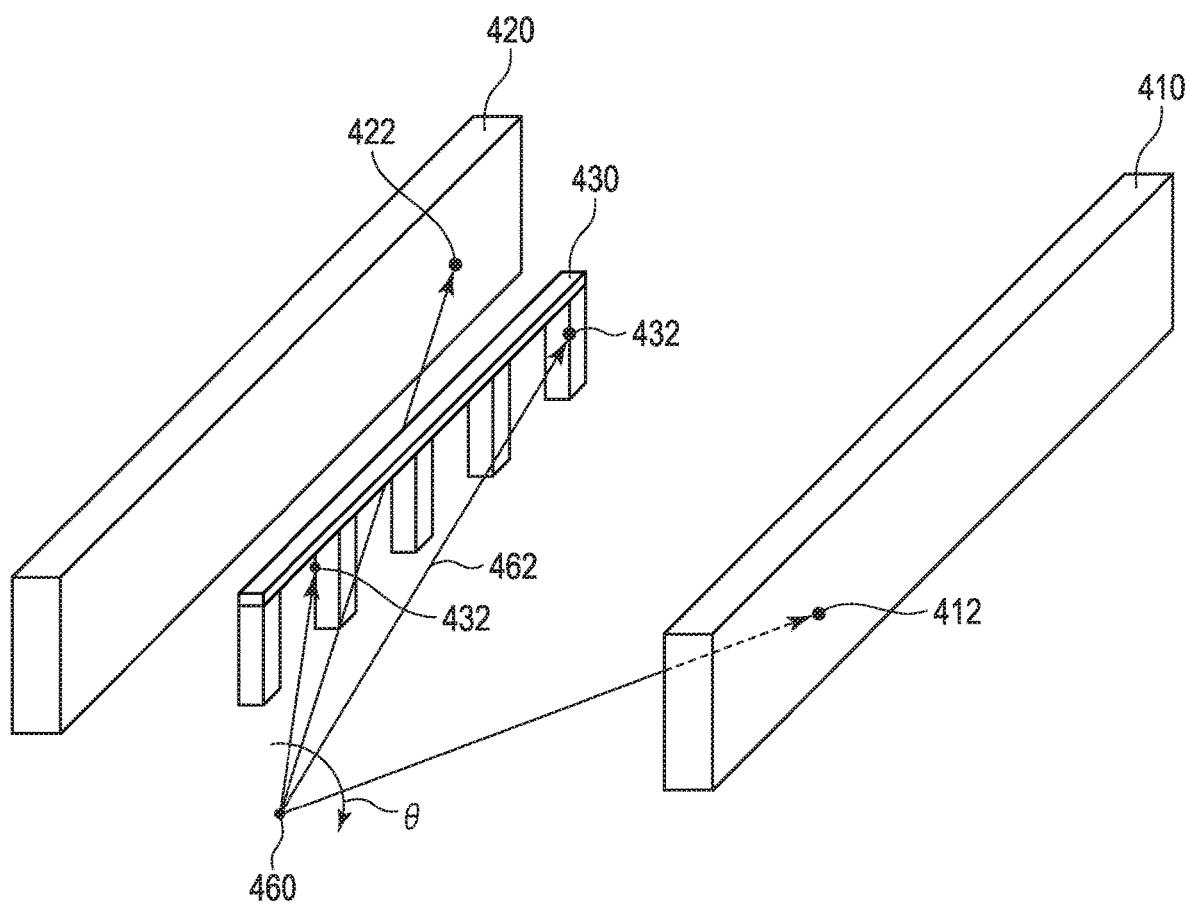
FIG. 5 is a diagram showing a three-dimensional map of a region to be observed.
Figure 6:
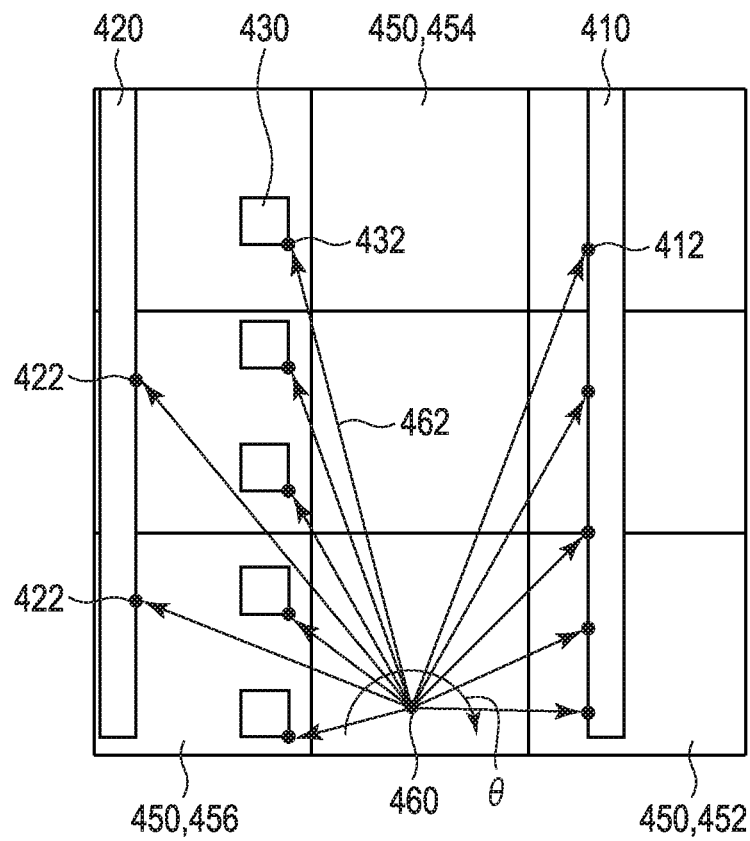
FIG. 6 is a diagram showing a two-dimensional map in a horizontal plane of the region to be observed.

Hereinafter, how the self position estimation apparatus 100 performs the self position estimation of the moving object 200 will be described in detail, referring to the example of the maps shown in FIGS. 5 and 6. FIG. 5 shows a three-dimensional map of the region to be observed, and FIG. 6 shows a two-dimensional map in a horizontal plane of the region to be observed. In the example of the maps, obstacle 410 exists on the right side of the traveling region (e.g., a road) of the moving object 200 and obstacles 420 and 430 exist on the left side thereof. Obstacle 410 and obstacle 420 are, for example, objects that are like walls and have planes substantially perpendicular to a horizontal plane. Obstacle 430 is like a fence and has elongated objects, for example, columns extending substantially perpendicular to the horizontal plane, and the elongated objects are arranged at intervals along the traveling direction of the moving object 200. Such a fence-like obstacle 430 is located in front of the wall-like obstacle 420 with respect to the traveling region of the moving object 200.

<Acquisition of Map Data D1 (S10)>

First, the acquisition unit 110 acquires map data D1. The map data D1 represents the maps shown in FIG. 5 and FIG. 6. The map data D1 may represent only the two-dimensional map shown in FIG. 6 without representing the three-dimensional map shown in FIG. 5. The map data D1 may be acquired by any known acquisition method. For example, the storage unit 150 may store map data in advance, and the acquisition unit 110 may read map data on a region to be observed from the storage unit 150 as necessary. Alternatively, map data of a range to be observed may be acquired from an external storage device or the like by communications, using a rough position obtained by a GPS sensor or utilizing a position used last time.

The map data D1 is not limited to the data described above as long as it represents an object to be observed. For example, the map data D1 may be a set of points, a function expression representing the surface shape of a local area, or polygon models of some typical buildings. The map data D1 is not limited to data on an obstacle, and may be represented by a texture or a vector indicating a specific mark. Further, the map data D1 does not have to represent a two-dimensional map in a horizontal plane, and may be projected on a non-horizontal plane. The map data D1 may include camera images and depth distance sensor data obtained at observation positions associated with the map coordinate system.

<Summary of Calculation of Correspondence Weights>

Next, the calculation unit 120 calculates, from the map data D1, a correspondence weight used for estimating the position of the moving object 200 in the map. In the present embodiment, as shown in FIG. 6, the map based on the map data D1 is divided into areas of a grid whose cells are at equal intervals, and a correspondence weight of each of the areas 450 is calculated. The correspondence weight is an index indicating whether or not each of the areas 450 is valid for the correspondence described later, and shows whether or not the observation point is a point of an object that greatly changes when the self position of the moving object 200 changes slightly.

Areas 450 include a right area 452, a central area 454, and a left area 456. Obstacle 410 exists in the right area 452, and obstacle 420 and obstacle 430 exist in the left area 456. The central area 454 includes a region through which the moving object 200 travels.

Although a grid whose cells are at equal intervals has been mentioned as a unit of weight calculation, this is not restrictive. It is preferable that the unit of weight calculation can be referred to when the map data D1 and the observation data D3 are compared with each other in the correspondence described later. For example, the unit of weight calculation may be polar coordinates representing a distance and an orientation from a specific position, and need not be defined at the equal intervals mentioned above. Further, the correspondence weight may be calculated for each of the obstacles or points, or for each of the elements constituting the map data. Weights may be calculated for the same area using a modification of the calculation unit 120 described later.

<Setting of Virtual Observation Position (S20)>

First, the calculation unit 120 sets a virtual observation position 460 on the map data D1 input from the acquisition unit 110, as shown in FIGS. 5 and 6. The height of the virtual observation position 460 is set to a value within the height range of the moving object 200, preferably, to a relatively low position. A method of setting the virtual observation position 460 is, for example, a method of selecting a position from positions arranged at equal intervals, a method of selecting one position on a target route if such a target route is available on map data, a method of setting a position in an open area with few objects, a method of using a sensor position at the time of generating map data, or the like. It is preferable to set on the map data D1 a position where the moving object 200 can exist, but this is not restrictive.

<Scan of Observation Vector and Acquisition of Depth (S30)>

Next, the calculation unit 120 scans the observation vector 462 starting from the virtual observation position 460 in a predetermined direction, and acquires depths to the obstacles 410, 420, and 430 included in the map data D1.

The scan of the observation vectors 462 is performed, for example, by rotating the observation vector 462 in a horizontal plane, with the virtual observation position 460 as a center.

Acquisition of the depths to the obstacles 410, 420, and 430 is performed as follows. First, referring to the map data, the obstacles 410, 420, and 430 that are closest to the virtual observation position 460 in each rotating direction θ of the observation vector 462, are identified. Next, intersection points 412, 422, and 432 between the identified obstacles 410, 420, and 430 and the straight line of the observation vector 462 are determined. Subsequently, distances between the virtual observation position 460 and the intersection points 412, 422, and 432 are calculated. Lastly, the calculated distances are obtained as depths in the direction of the observation vector 462.

In the example mentioned above, the observation vector 462 is scanned by rotating the observation vector 462 in the horizontal plane, but the direction in which the observation vector 462 is scanned is not limited to this but may be along a plane that is at a certain angle to the horizontal plane. Further, some rotating directions may be combined, and the observation vector 462 may be scanned with respect to the region of the plane directly confronting the virtual observation position 460. In particular, the scanning direction of the observation vector 462 is preferably set to a scanning direction assumed by the distance sensor of the observation unit 130. Further, the scanning direction of the observation vector 462 may be set to a scanning direction that can cover the area for which weights are calculated. For example, the observation vector 462 may be scanned within a predetermined angle range or may be scanned for each of the areas of the map data. Also, the observation vector 462 may be scanned for each of obstacles or three-dimensional points in the map data D1.

<Calculation of weight (S40)>

Figure 7A:
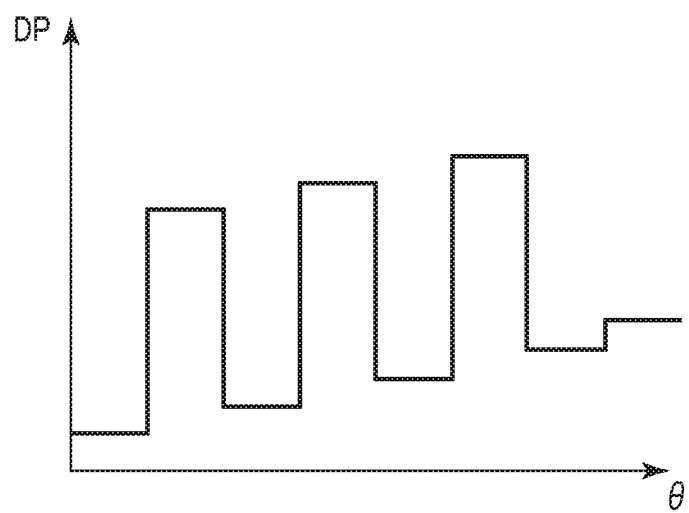
FIG. 7A is a diagram showing a variation amount in which the depth of the left region depicted in FIG. 6 varies in the rotating direction.
Figure 7B:
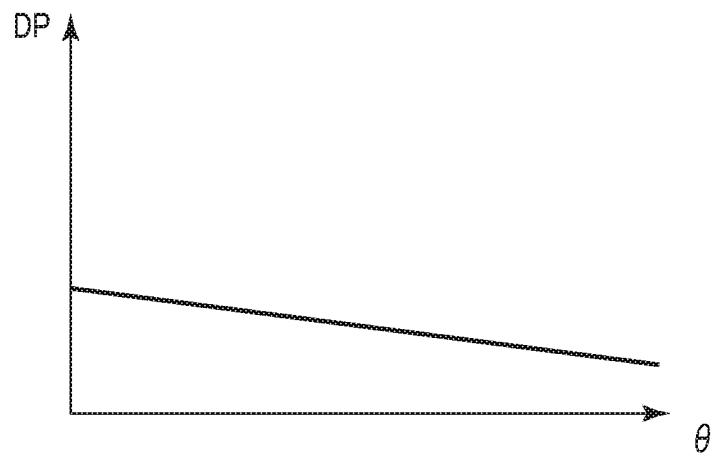
FIG. 7B is a diagram showing a variation amount in which the depth of the right region depicted in FIG. 6 varies in the rotating direction.

Subsequently, the calculation unit 120 calculates a variation amount of depth in a predetermined direction, i.e., the rotating direction θ, from depths acquired by scanning the observation vector 462 in the predetermined direction. FIG. 7A shows how a variation amount of depth DP changes in the rotating direction θ in the left area 456 where obstacle 420 and obstacle 430 exist. FIG. 7B shows how a variation amount of depth DP changes in the rotating direction θ in the right area 452 where obstacle 410 exists. In the left area 456, the variation amount of depth DP changes drastically, as shown in FIG. 7A. On the other hand, in the right area 452, the variation amount of depth DP changes at a constant rate, as shown in FIG. 7B.

Figure 8A:
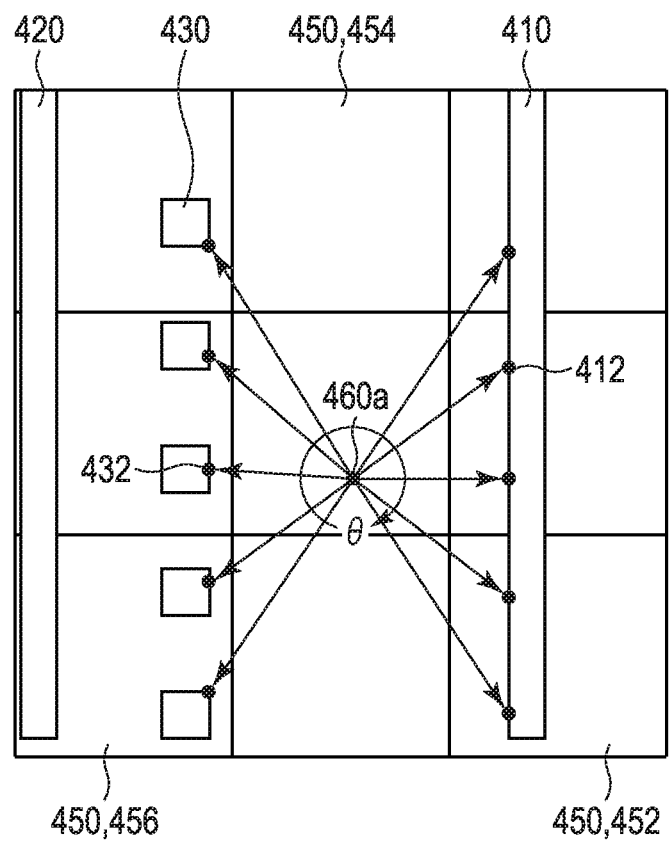
FIG. 8A is a diagram showing a virtual observation position at which only obstacles on the near side are observed.
Figure 8B:
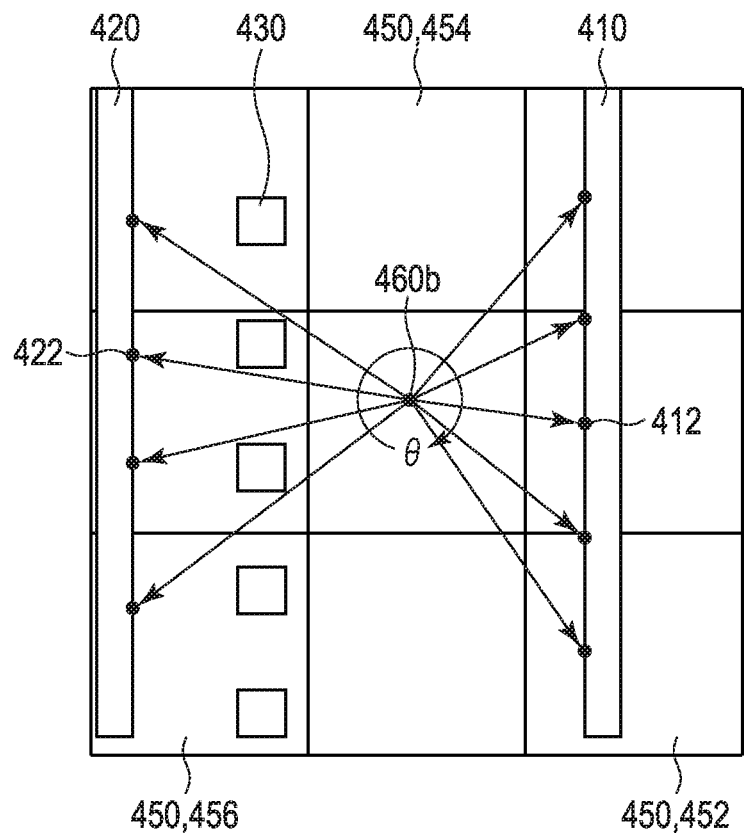
FIG. 8B is a diagram showing a virtual observation position at which only obstacles on the rear side are observed.
Figure 9A:
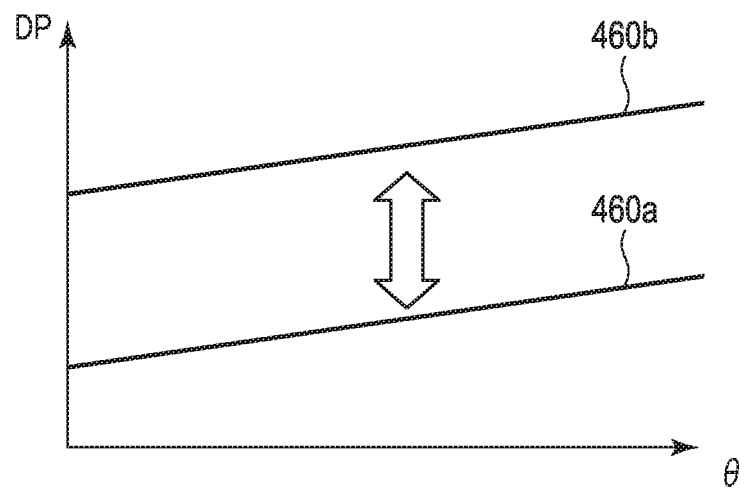
FIG. 9A is a diagram showing a variation amount in which the depth of the left region varies with respect to the virtual observation positions shown in FIGS. 8A and 8B.
Figure 9B:
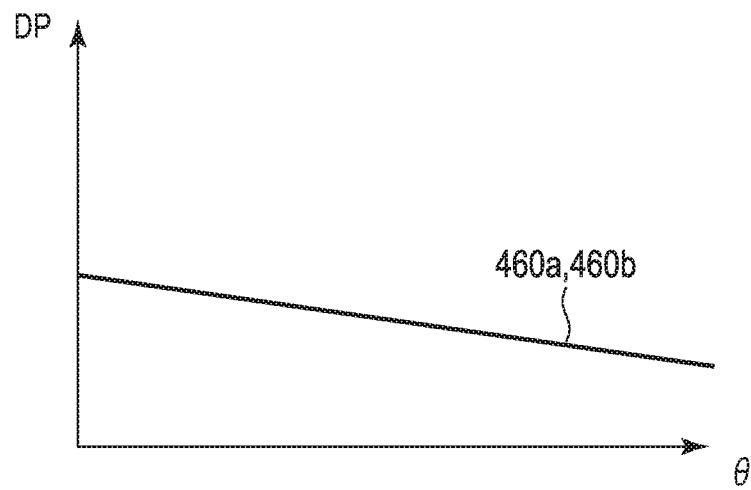
FIG. 9B is a diagram showing a variation amount in which the depth of the right region varies with respect to the virtual observation positions shown in FIGS. 8A and 8B.

Further, the calculation unit 120 calculates a correspondence weight between the map data D1 and the observation data D3 for each of areas 450 in the map, based on the calculated variation amounts of depth DP. To be more specific, for the left area 456 where the variation amount of depth DP is large, the calculation unit 120 calculates a weight indicating that the area is not valid for the correspondence with the observation data D3. For the right area 452 where the variation amount of depth DP is small, the calculation unit 120 calculates a weight indicating that the area is valid for the correspondence with the observation data D3. In other words, the calculation unit 120 calculates weights such that the validity of the map data decreases as the variation amount of depth DP increases and increases as the variation amount of depth DP decreases. Where the variation amount of depth DP is small, the calculation unit 120 calculates a weight indicating that the map data is valid data.

Where various depths DP exist as in the left area 456, the virtual observation position 460 may be, in an extreme case, a virtual observation position 460a from which only the obstacle 430 located on the near side is observed as shown in FIG. 8A, or a virtual observation position 460b from which only the obstacle 420 located on far side is observed as shown in FIG. 8B. Thus, the depth DP varies greatly in the left area 456, as shown in FIG. 9A. On the other hand, the depth DP varies at a constant rate in the right area 452, so that the depth DP does not change greatly when the virtual observation position 460 moves slightly, as shown in FIG. 9B. As can be seen from this, where depths DP are present, it may be difficult to determine which of obstacles 420 and 430 in the map data is being observed.

As described above, whether or not each of the areas in the map based on the map data D1 is valid for the correspondence can be determined by calculating a correspondence weight based on the variation amount of depth. The calculation of a correspondence weight may use a differential value or the number of variations of the depth DP with respect to the rotating direction θ, a function fitting error, and the like. In regard to the value of the weight, the magnitude relation is appropriately inverted by determining which one of a matching degree or an error between the map data D1 and the observation data D3 should be evaluated in the correspondence described later.

In the above, reference has been made to the case where a correspondence weight is calculated by performing a scan once with respect to a single virtual observation position 460. However, some virtual observation positions may be set and weights calculated for the virtual observation positions may be integrated. Further, weights for scanning directions may be calculated and integrated. As the integration method, weights for each of observation positions may be integrated, or weights for a particular position on the map data may be integrated. Further, weights may be calculated by changing the depth acquisition interval or the measurement range a number of times when a scan is performed. An error of a sensor mounted on the moving object may be simulated and added to the depth acquired from the map data.

In the above, reference has been made to the case where a single virtual observation position 460 is set, and a weight is calculated in a single scanning direction with respect to the virtual observation position 460. However, some virtual observation positions may be set and weights calculated for the virtual observation positions may be integrated. Further, weights for scanning directions may be calculated and integrated. As the integration method, weights for each of virtual observation positions may be integrated, or weights for a particular position on the map data may be integrated. Further, weights may be calculated by changing the depth acquisition interval or the measurement range a number of times when a scan is performed. An error of a distance sensor provided in the observation unit 130 may be simulated and added to the depth acquired from the map data.

<Specific Example of Weight>

A specific example of a predetermined direction in which the variation amount of depth is scanned and a specific example of a weight to be calculated will be described.

In the case of targets, such as poles or a fence, in which the same shape and a gap repeat at constant intervals, the estimation error of movement is large in the repeat direction. Therefore, the depth variation is scanned in the repeat direction and is reflected in a correspondence weight. Even in the case of such a shape, a direction different from the repeat direction, such as the depth direction, may be useful for position estimation. It is therefore possible to provide a configuration that performs a scan in directions and calculates weights for determining whether the shape is repeated.

Where the object is a plant such as a shrubbery or a hedge, a gap is present between the branches and leaves, and different depths are observed by each of the observation vectors in the observation range of the plant. That is, a width attributable to the shrubbery is present in the depth direction. Therefore, the variance of depth is used as a weight with respect to the observation direction. As a result, the weight can be used for an object for which depths are observed.

Depending on the size of an area for which correspondence is evaluated and on the resolution of an observation vector, the variance in the depth direction should be taken into account where a variation smaller than the resolution may occur, as in the environment where objects of different shapes exist, such as dust and wastes existing in disorder, factories in which small parts such as screws are piled up, and the environment where different fences are observed in an overlap state.

When movement is performed in a warehouse, the position accuracy may be deteriorated by loads stored on shelves, as in the case where the loads are moved and the case where the shapes of the loads change such as a bag or cloth. Therefore, based on a layout drawing and the arrangement of the shelves detected by a known process, the weights for the loads are calculated by performing a scan in the alignment direction of the shelves. Rather than calculating a weight collectively for the entire area in which the loads are stored, a weight for each arrangement of loads can be calculated. In regard to the shapes, a weight for a target having a fine depth undulation, such as a bag or cloth, may be calculated, or a weight for a target having flat surfaces, such a box or a shelf, may be calculated.

When a bank or a wall of a building that is inclined to a horizontal plane is observed using a distance sensor with which the horizontal plane is observed, the angle of the observation plane may vary due to an attitude change of the moving object, such as a change in the rolling angle, even where observation is performed from the same position. Since the observed height of the object changes, the depth also changes. Therefore, a depth variation in the vertical direction is used. Thereby, a weight can be determined, with the inclination from the horizontal plane being taken into account. Similarly, when a distance is observed in a specific plane, whether or not the target is inclined with respect to the normal direction to the observation plane is calculated from the variation amount of depth and is used as a weight.

<Observation of Surroundings (S50)>

Figure 10:
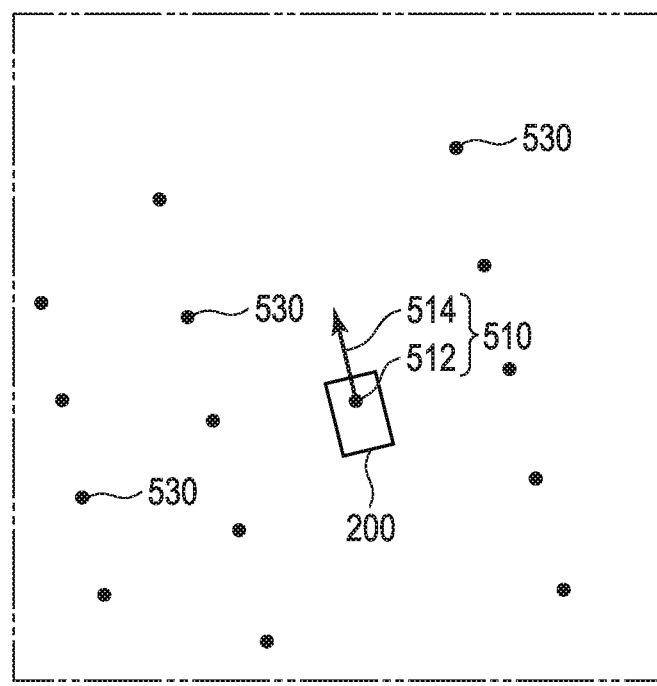
FIG. 10 is a diagram showing observation data that is acquired by an observation unit and in which obstacles around the moving object are indicated as a set of observation points.

Next, the observation unit 130 observes the environment around the moving object 200 and acquires observation data D3. It is preferable that the observation unit 130 can observe the shapes of obstacles 410, 420, and 430 represented by the map data D1. For example, in the present embodiment, a distance sensor is used to observe the distances from the self position of the moving object 200 to the obstacles 410, 420, and 430 in the respective directions, and as shown in FIG. 10, observation data D3 is acquired such that the shapes of the obstacles 410, 420, and 430 around the moving object 200 are processed as a set of observation points 530. The self position 510 of the moving object 200 includes position coordinates 512 of the moving object 200 and the moving direction 514 of the moving object 200. As the acquisition method of observation data D3, a method of estimating an attribute of an observable object using a camera image and acquiring observation data using a typical shape model of the attribute is known, and a method of estimating a distance from the moving object using geometric constraints is also known. That is, the acquisition method of observation data D3 is not limited to what has been described above.

<Estimation of Self Position (S60)>

Next, the estimation unit 140 associates the map data D1 with the observation data D3 based on the weight data D2 to estimate the self position of the moving object 200 in the map from which the observation data D3 has been acquired. The method used for correspondence is preferably a method that can be used for evaluating the matching degree or error between the map data D1 and the observation data D3 for each of the areas 450 for which the correspondence weights are calculated.

For example, where a weight is calculated for each of three-dimensional points, the correspondence based on Iterative Closest Point (ICP) can be used, and where a weight is calculated for each of the cells of a grid, the correspondence based on Normal Distributions Transform (NDT) can be used. Even if the unit used for correspondence is different from an area for which the weight is calculated, the corresponding area may be referred to, and the area 450 does not necessarily have to match with the correspondence technique. The correspondence weight may be used as a relative weight for each unit used for evaluating the correspondence, or may be used for selecting a unit used for evaluating the correspondence using an appropriate threshold. Where the map data D1 and the observation data D3 are associated with each other, the self position of the moving object 200 in the map is estimated based on map data D1 that reproduces the observation data D3 in a plausible manner.

The correspondence between map data D1 and observation data D3 based on weight data D2 is performed by aligning an object based on the map data D1 and an object based on the observation data D3 with each other. Specifically, this is performed by aligning the positions of the observation points 530 included in the observation data D3 with the positions of the obstacles 410, 420, and 430 in the map data D1. At this time, although alignment is performed for observation points 530, a region having a high correspondence weight is prioritized.

Figure 11:
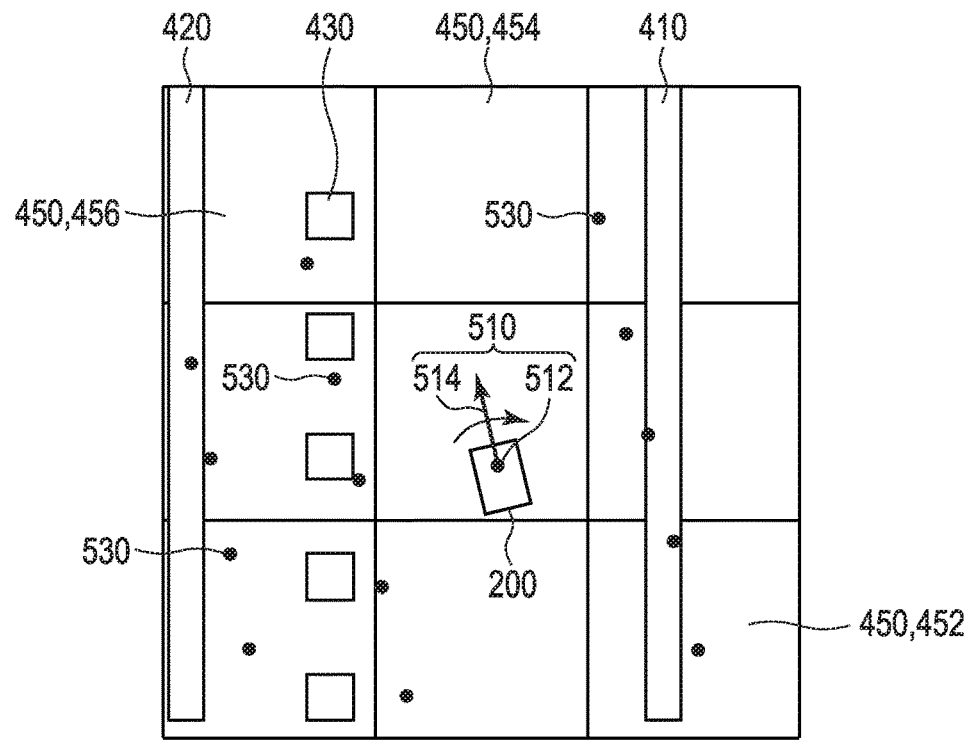
FIG. 11 is a diagram showing a map based on map data and observation points included in observation data.
Figure 12:
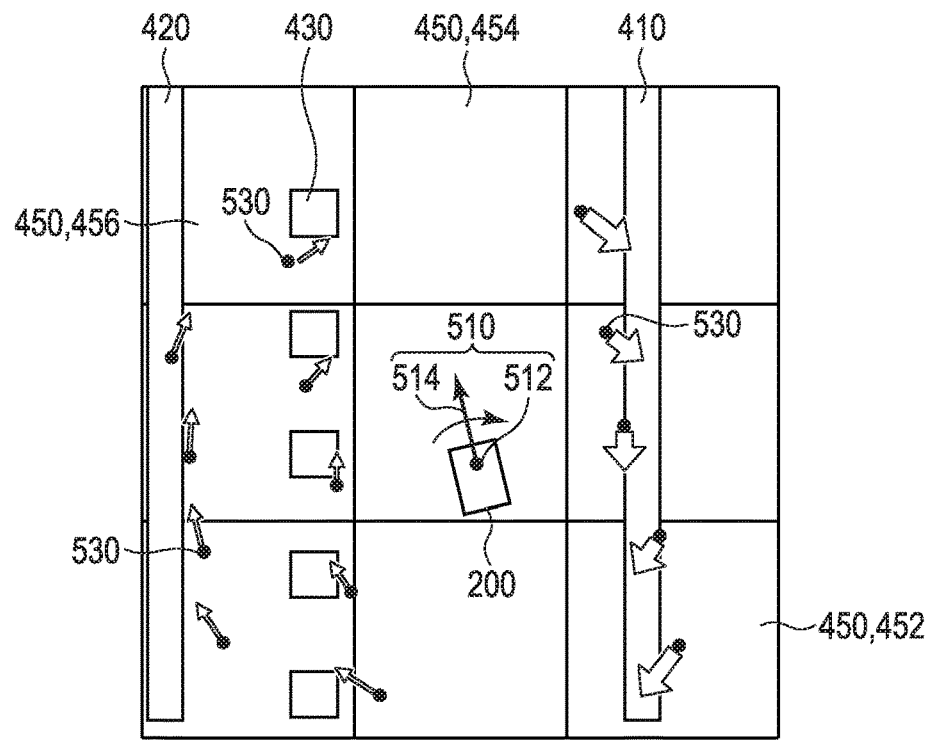
FIG. 12 is a diagram showing how the observation points shown in FIG. 11 are aligned with obstacles in the map.

FIG. 11 shows a map based on map data D1 and observation points 530 included in observation data D3. FIG. 12 shows how observation points 530 are aligned with obstacles 410, 420, and 430 in the map. In FIG. 12, the degrees of correspondence weights are expressed by the widths of arrows. As a result of the alignment, as shown in FIG. 13, the self position 510 of the moving object 200 is changed in the map based on the map data D1, that is, the position coordinates 512 of the moving object 200 and the moving direction 514 of the moving object 200 are changed. The estimation unit 140 estimates that the changed position coordinates 512 of the moving object 200 and the changed moving direction 514 of the moving object 200 represent the self position 510 of the moving object 200.

<Output of Self Position (S70)>

Subsequently, the estimation unit 140 outputs information on the estimated self position 510 of the moving object 200 as self position data D4. That is, the self position data D4 includes map data D1 and information on the position coordinates 512 and the moving direction 514 of the moving object 200 relative to the map based on the map data D1.

[Automatic Driving]

Figure 15:
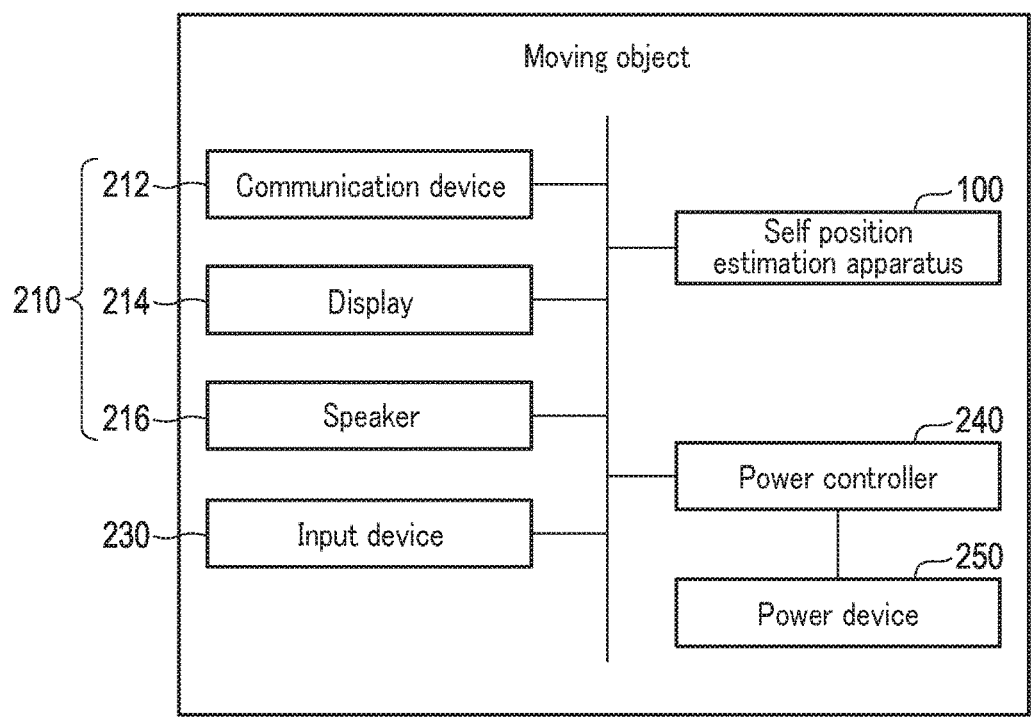
FIG. 15 is a block diagram showing the moving object depicted in FIG. 14.

The self position data D4 output from the self position estimation apparatus 100 is used for the automatic driving of the moving object 200. FIG. 14 is a diagram showing an example of the structure of the moving object 200. FIG. 15 is a block diagram of the moving object 200. For example, the moving object 200 travels in the traveling direction (arrow X direction).

The moving object 200 is provided with a self position estimation apparatus 100, an output device 210, an input device 230, a power controller 240, and a power device 250. The self position estimation apparatus 100, the output device 210, the input device 230, and the power controller 240 are connected through a bus.

The output device 210 outputs various output information. The output device 210 has, for example, a communication function for transmitting output information, a display function for displaying the output information, and a sound output function for outputting a sound indicating the output information. For example, the output device 210 includes a communication device 212, a display 214, and a speaker 216.

The input device 230 receives various instructions and information inputs from the user. The input device 230 is, for example, a pointing device such as a mouse or a trackball, or an input device such as a keyboard.

The power device 250 is a device configured to drive the moving object 200. The power device 250 has, for example, an engine, a motor, wheels, an accelerator device, a brake device, a steering device, etc.

The power controller 240 controls the power device 250. The power device 250 is driven under the control of the power controller 240. For example, the power controller 240 determines the surrounding situation, based on the output information generated by the self position estimation apparatus 100, and controls an acceleration amount, a braking amount, a steering angle, etc. For example, the power controller 240 controls the moving object 200 such that the currently running lane is kept while avoiding obstacles.

[Advantages]

As described above, according to the present embodiment, a correspondence weight between the observation data around the moving object and the map data is calculated based on a variation amount of depth in a predetermined direction, so that the self position of the moving object can be estimated robustly even where there is an object whose observation point changes significantly with respect to a slight change in the self position of the moving object.

[First Modification]

A first modification of the calculation unit 120 will be described. In the present modification, the calculation unit 120 does not set virtual observation positions but calculates weights using uneven shapes of the surfaces of objects in the map data D1.

Figure 16:
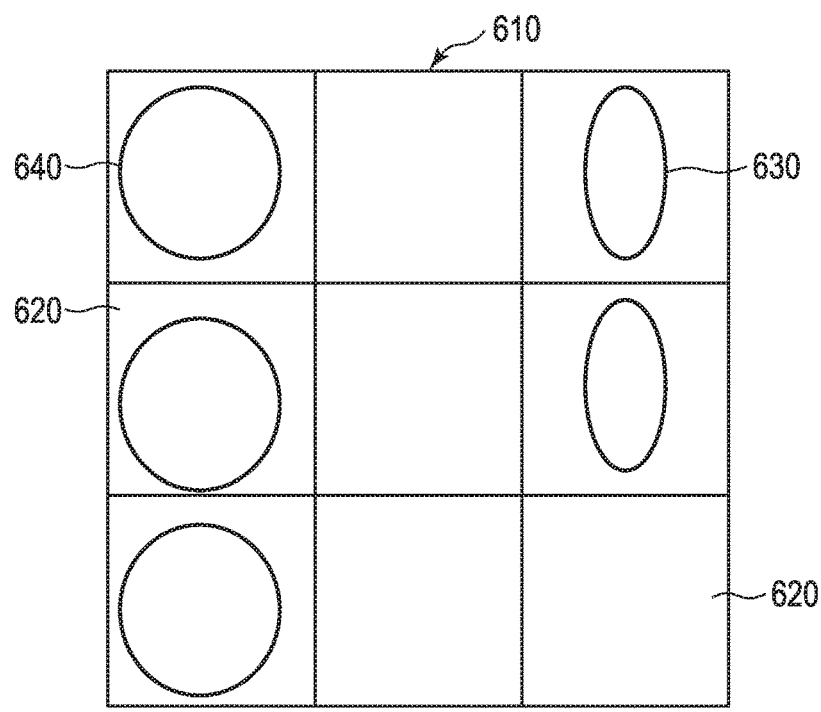
FIG. 16 is a diagram for illustrating how weight calculation is performed according to the first modification of the first embodiment.

The calculation unit 120 calculates the surface shape of an obstacle in the map data D1, and associates the map data D1 with the observation data D3, based on the unevenness of the surface shape, that is, the variation amount in which a depth varies when observed in the normal direction. The surface shape is arbitrary as long as the normal direction thereof can be acquired. For example, in the case of NDT, as shown in FIG. 16, the map 610 based on the map data D1 is divided into grid cells, and distributions of a group of three-dimensional points of an obstacle included in each of the cells 620 are approximated by the Gaussian distribution. In the obstacles 630 and 640 approximated by the Gaussian distribution, the direction of the spread of points and the distribution thereof are represented by the eigenvalues of the covariance of the Gaussian distribution and the eigenvectors thereof.

Figure 17:
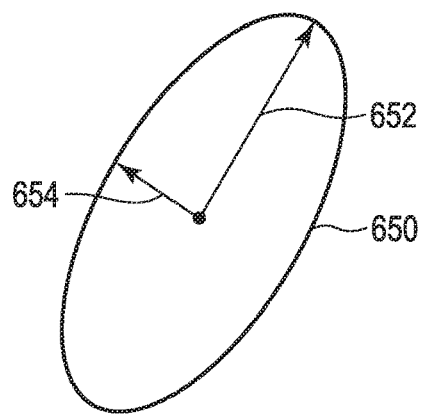
FIG. 17 is a diagram for illustrating an object approximated by a Gaussian distribution.

FIG. 17 is a diagram for illustrating an object 650 approximated by the Gaussian distribution. The object 650 approximated by the Gaussian distribution has an eigenvector 652 for the largest eigenvalue and an eigenvector 654 for the smallest eigenvalue.

The ratio of the largest eigenvalue to the smallest eigenvalue is used to obtain a spread of points defined by the Gaussian distribution. The distance from the center of the Gaussian distribution is defined as a depth. Thereby, it can be determined whether the object is a flat obstacle 630 having a small spread in the normal direction or an obstacle 640 having a uniform spread in each direction and having isotropic points. Even where an obstacle having a gap between branches and leaves such as a plant is included in the map data, a determination is made as to whether the obstacle has a shape in which the points are spread isotropically, and this enables calculation of a weight such that the weight is that of a target for which the variation amount of depth increases in response to a slight change in the self position.

Although reference has been made to the method of calculating a spread of points according to the Gaussian distribution for each of the cells 620, this is not restrictive as long as the uneven shape of the obstacle can be calculated. For example, a virtual observation position may be moved to a position around each of the obstacles, or the distance between a normal line and a plane may be determined by plane fitting. Also, the direction in which an uneven shape is determined is not limited to a normal direction.

In the present modification, a depth is set in the normal direction to the surface of an obstacle in the map data D1. Unlike the first embodiment in which virtual observation positions are set, the self position of the moving object 200 can be robustly estimated because a spread of points is evaluated in a proper direction for each of the cells 620 for which weights are calculated.

[Second Modification]

A second modification of the calculation unit 120 will be described. In the present modification, the calculation unit 120 fits a virtual model to the map data D1 and calculates a weight using a variation amount of depth based on the virtual model. Hereinafter, how weights are calculated according to the present modification will be described with reference to FIGS. 18A to 18C.

Figure 18A:
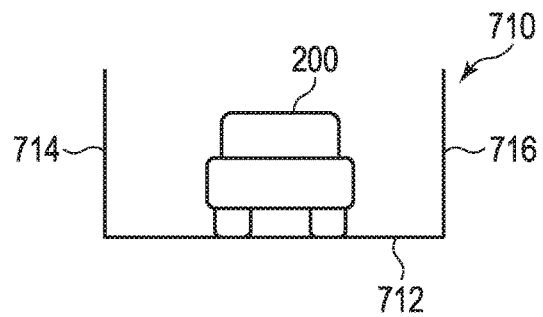
FIG. 18A is a diagram for illustrating how weight calculation is performed according to the second modification of the first embodiment, and shows an assumed shape.

First, the calculation unit 120 sets an assumed shape 710 at a virtual observation position 460, as shown in FIG. 18A. The assumed shape 710 is the shape of an obstacle that is assumed around the virtual observation position 460. The assumed shape 710 is assumed such that the virtual observation position 460 is on a horizontal plane 712 and the obstacle around the virtual observation position 460 has vertical planes 714 and 716 perpendicular to the horizontal plane 712.

In an environment in which many artifacts are present and where map data in a room is used, the shape of an assumed obstacle is used. If the shape assumed to exist in the map data can be set, the shape of the assumed obstacle is not necessarily used. Where the altitude can be used, a configuration using an inclined road surface or a configuration in which a typical obstacle model is arranged may be used.

Figure 18B:
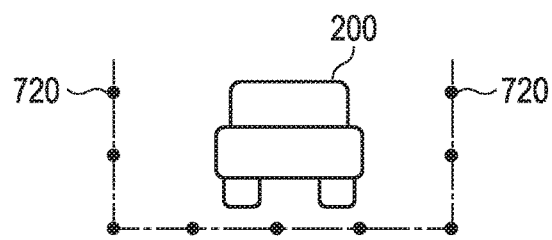
FIG. 18B is a diagram for illustrating how weight calculation is performed according to the second modification of the first embodiment, and shows sampling points on the assumed shape.

Next, the calculation unit 120 samples points 720 on the assumed shape 710, as shown in FIG. 18B. These points 720 correspond to points at which a depth described later is acquired. The sampling may be performed at appropriate regular intervals, and the density may be changed in accordance with a characteristic region of the assumed shape 710, such as an edge portion.

Figure 18C:
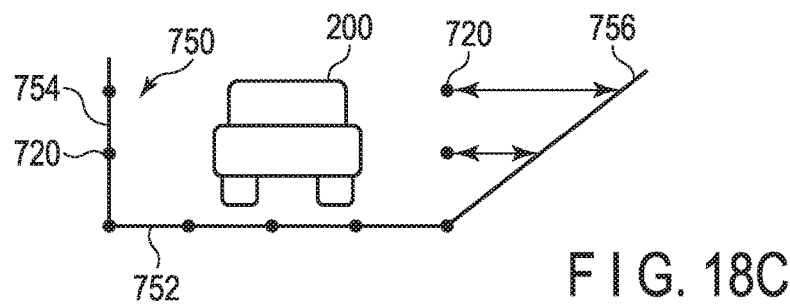
FIG. 18C is a diagram for illustrating how weight calculation is performed according to the second modification of the first embodiment, and shows sampling points on the assumed shape and an actual shape of an obstacle.

Subsequently, as shown in FIG. 18C, the calculation unit 120 obtains a depth by referring to the map data D1 around the moving object 200 for each of the sampled points 720. In this case, the depth is the distance from the sampled point 720 to the actual shape 750 of the obstacle in the map data D1. The actual shape 750 has a horizontal plane 752, a vertical surface 754, and an inclined surface 756. A depth is acquired by calculating the distance from the sampled point 720 to the actual shape 750. The direction of the depth is, for example, the normal direction to the vertical planes 714 and 716. Further, the calculation unit 120 acquires a variation amount of depth by scanning sampled point 720 along the surface of the assumed shape 710.

Next, the calculation unit 120 calculates a correspondence weight based on the variation amount of depth at each of the sampled points 720. The weight calculation may be performed for each of the sampled points 720 or for each of the areas in the map data.

Since the correspondence weight can be changed for map data that deviates from the assumed shape, the self position of the moving object 200 can be robustly estimated by designating an effective shape in advance and calculating a correspondence weight therefor.

Second Embodiment

Figure 19:
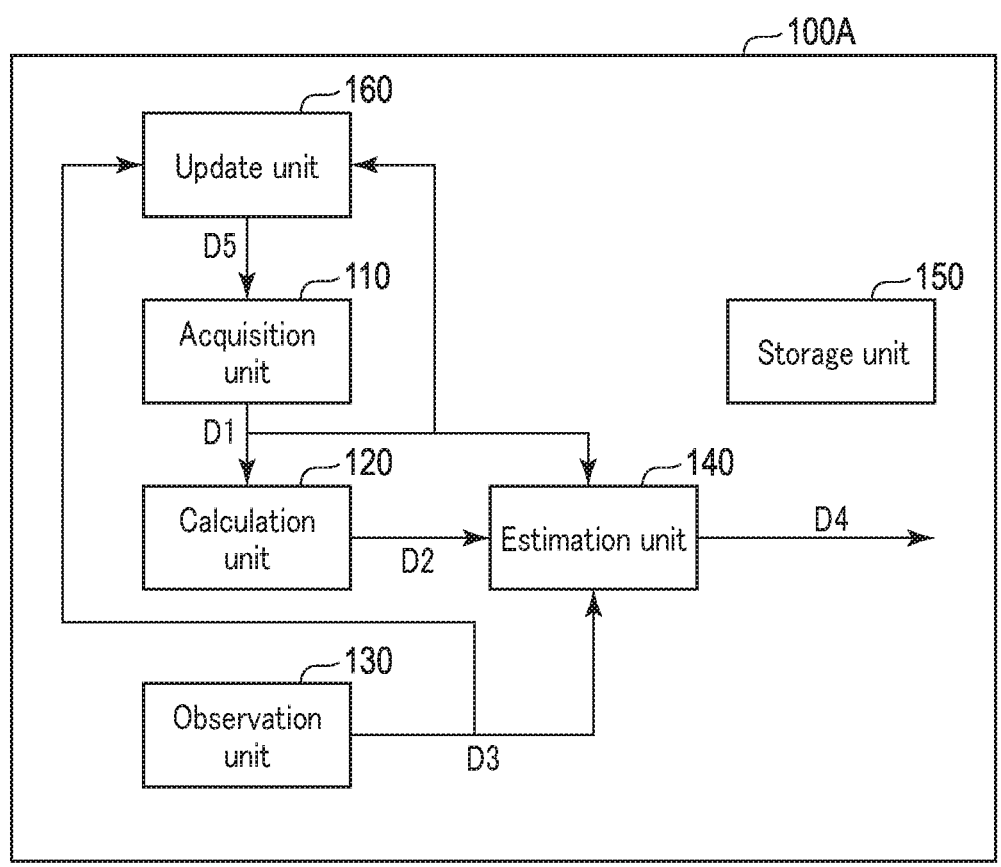
FIG. 19 is a diagram showing a configuration of a self position estimation apparatus according to the second embodiment.

FIG. 19 is a diagram showing the configuration of a self position estimation apparatus 100A according to the second embodiment. In FIG. 19, the elements denoted by the same reference numerals as used in FIG. 1 are elements similar to those of FIG. 1, and a detailed description of such elements will be omitted. Hereinafter, a description will be given mainly of the differences. In other words, the points that will not be mentioned below are similar to those of the aforesaid first embodiment.

In the self position estimation apparatus 100A according to the second embodiment, the acquisition unit 110 and the calculation unit 120 are provided outside the moving object 200. For example, the acquisition unit 110 and the calculation unit 120 are provided for a cloud server that executes processing on the cloud.

The self position estimation apparatus 100A is provided with an update unit 160 in addition to the elements of the self position estimation apparatus 100 of the first embodiment. The update unit 160 is configured to acquire observation data D3 from the observation unit 130 and to update map data D1 based on the acquired observation data D3. The update unit 160 is configured to output the updated map data to the acquisition unit 110 as updated map data D5.

The acquisition unit 110 acquires the updated map data D5 from the update unit 160, and outputs this as new map data D1 to the calculation unit 120. The calculation unit 120 calculates a correspondence weight between the new map data D1 and the observation data D3, based on the input new map data D1. The method of calculating correspondence weights is similar to that of the first embodiment.

For example, the update unit 160 is configured to acquire observation data D3 on the range outside the map data D1 newly observed by the observation unit 130 and to integrate the observation data D3 into the map data D1, thereby expanding the range of the map data D1. Also, the update unit 160 is configured to delete data of an object from the map data D1 if that object is observed as having disappeared. The configuration of the update unit 160 is not limited to this as long as the process of changing the map data D1 can be performed.

Further, the observation data acquired by the update unit 160 may be observation data acquired by sensors, and this enables the map data D1 to be updated more efficiently.

Also, the position of the moving object 200 in the map based on the map data D1 may be estimated using the correspondence weight of the self position estimation apparatus 100A, or may be estimated using the result of estimation obtained by using another sensor.

In the self position estimation apparatus 100A according to the present embodiment, the acquisition unit 110 outputs input updated map data D5 as new map data D1 to the calculation unit 120, each time the updated map data D5 is input from the update unit 160. The calculation unit 120 calculates a correspondence weight between the map data D1 and the observation data D3, each time new map data D1 is input thereto.

Although the first embodiment uses a predetermined weight calculation method, the present embodiment can change the calculation method using observation data that is used for updating. For example, the observation position of the observation data D3 used for updating can be set as a virtual observation position, or the resolution of the observation data D3 can be set as the resolution used for acquiring a depth.

Thus, unlike the self position estimation apparatus 100 of the first embodiment that calculates correspondence weights using given map data D1, the self position estimation apparatus 100A of the present embodiment calculates correspondence weights using the map data D1 that is updated as needed, so that the calculated correspondence weights accord with the current environment. Since the map data D1 and the observation data D3 are associated with each other using a correspondence weight of the updated map data, the self position of the moving object 200 in the map data D1 can be estimated robustly.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the inventions.

The invention claimed is:

1. A self position estimation apparatus configured to estimate a position of a moving object in a map, the self position estimation apparatus comprising:
    an acquisition unit configured to acquire map data; and
    a calculation unit configured to calculate a correspondence weight between (i) external observation data acquired from a region around the moving object and (ii) the map data, based on a variation amount of depth in a predetermined direction.

2. The self position estimation apparatus according to claim 1, further comprising:
    an observation unit configured to acquire the observation data; and
    an estimation unit configured to estimate the position of the moving object in the map by associating the map data with the observation data based on the weight.

3. The self position estimation apparatus according to claim 1, further comprising an update unit configured to update the map data,
    wherein the acquisition unit acquires updated map data updated by the update unit, and
    wherein the calculation unit calculates the weight when the acquisition unit acquires the updated map data.

4. The self position estimation apparatus according to claim 1, wherein the calculation unit sets a virtual observation position in the map data and sets a distance from the virtual observation position to an object as the depth.

5. The self position estimation apparatus according to claim 1, wherein the calculation unit calculates a surface shape in the map data, and regards a difference from the surface shape in a normal direction of the surface shape as the depth.

6. The self position estimation apparatus according to claim 1, wherein the calculation unit calculates a weight such that the map data is considered more invalid as the variation amount increases.

7. The self position estimation apparatus according to claim 1, wherein the calculation unit calculates a weight such that the map data is considered more valid as the variation amount decreases.

8. The self position estimation apparatus according to claim 1, wherein the calculation unit calculates a weight such that the map data is considered valid where the variation amount is small.

9. The self position estimation apparatus according to claim 1, wherein the calculation unit fits a virtual model to the map data and calculates a weight using a variation amount of depth obtained based on the virtual model.

10. The self position estimation apparatus according to claim 2, wherein the calculation unit calculates the weight based on the observation data in addition to the variation amount of depth.

11. A self position estimation method of estimating a position of a moving object in a map, the method comprising:
acquiring map data; and
calculating a correspondence weight between (i) external observation data acquired from a region around the moving object and (ii) the map data, based on a variation amount of depth in a predetermined direction.

12. The self position estimation method according to claim 11, further comprising:
acquiring the observation data; and
estimating the position of the moving object in the map by associating the map data with the observation data based on the weight.

13. A non-transitory computer-readable storage medium storing a program configured to cause a computer to execute functions of elements of the self position estimation apparatus according to claim 1.

14. A non-transitory computer-readable storage medium storing a program configured to cause a computer to execute processes of the self position estimation method according to claim 11.

15. The self position estimation apparatus according to claim 1, wherein the self position estimation apparatus is mounted on the moving object.

16. The self position estimation apparatus according to claim 1, wherein the observation data comprises data acquired in real-time based on an immediate region around the moving object.

17. The self position estimation apparatus according to claim 1, wherein the map data comprises data on an immediate region around the moving object.

18. The self position estimation apparatus according to claim 2, wherein the observation unit comprises a distance sensor.

* * * * *